United States Patent [19]

Secretan et al.

[11] Patent Number: 5,204,124
[45] Date of Patent: Apr. 20, 1993

[54] CONTINUOUS EXTRUDED BEAD OBJECT FABRICATION APPARATUS

[76] Inventors: Stanley Secretan, 9211 Elizabeth Lake Rd., Leona Valley, Calif. 93551; Earl T. Bayless, 28051 Wildwind Rd., Canyon Country, Calif. 91351

[21] Appl. No.: 789,977

[22] Filed: Nov. 12, 1991

Related U.S. Application Data

[63] Continuation-in-part of Ser. No. 594,046, Oct. 9, 1990, abandoned.

[51] Int. Cl.⁵ .............................................. B29C 35/08
[52] U.S. Cl. .................................... 425/145; 425/150; 425/174.4
[58] Field of Search ............... 425/135, 174, 174.4, 425/145, 150; 264/22, 308; 364/468, 473; 118/696, 697, 620, 323; 156/58, 59, 272.8, 273.3, 275.5, 379.6; 427/53.1, 54.1, 55, 56.1

[56] References Cited

U.S. PATENT DOCUMENTS

| | | | |
|---|---|---|---|
| 4,100,141 | 7/1978 | O'Sullivan | 526/301 |
| 4,575,330 | 3/1986 | Hull | 425/174.4 |
| 4,665,492 | 5/1987 | Masters | 425/145 X |
| 4,749,347 | 6/1988 | Valavaara | 425/135 |
| 4,759,887 | 7/1988 | Geissler et al. | 425/174 X |
| 4,913,859 | 4/1990 | Overton et al. | 264/22 X |
| 4,956,134 | 9/1990 | Luc | 425/174 X |
| 4,961,886 | 10/1990 | Eckstein et al. | 425/174.4 X |
| 5,104,689 | 4/1992 | Hayden et al. | 118/696 X |
| 5,134,569 | 7/1992 | Masters | 425/174 X |
| 5,141,680 | 8/1992 | Almquist et al. | 264/22 |

FOREIGN PATENT DOCUMENTS

| | | | |
|---|---|---|---|
| 2583333 | 12/1986 | France | 264/22 |
| 61-116322 | 6/1986 | Japan | 425/174.4 |
| 61-217219 | 9/1986 | Japan | 264/22 |

Primary Examiner—Richard L. Chiesa
Attorney, Agent, or Firm—Jack C. Munro

[57] ABSTRACT

A apparatus for economically producing both large and small objects wherein a continuous extrusion of viscous liquid is to be dispensed from a nozzle mounted directly adjacent to an object support platform. Preprogrammed movement is achieved between the nozzle and the object support platform in accordance with the size and shape of the object that is to be fabricated. A viscous liquid is to be dispensed a layer at a time resulting in building of the object layer-by-layer from the bottom of the object to the top of the object. Fibers may be added to the viscous liquid when fabricating large objects, thus providing structural reinforcements. The viscous liquid is to be rapidly curable upon the application of light energy with this light energy supplied at a three hundred sixty degree pattern about the nozzle. A light shield immediately adjacent to the nozzle prevents premature curing of viscous liquid. The high viscosity of the liquid retains the controlled shape prior to curing. After a layer is produced by the nozzle, vertical, horizontal or angular relative movement between the nozzle and the object support platform occurs with another layer then being produced.

9 Claims, 2 Drawing Sheets

CONTINUOUS EXTRUDED BEAD OBJECT FABRICATION APPARATUS

REFERENCE TO PRIOR APPLICATION

This application is a continuation-in-part of U.S. patent application Ser. No. 07/594,046, filed Oct. 9, 1990, by the same title, now abandoned.

BACKGROUND OF THE INVENTION

The field of this invention relates to an apparatus for constructing large or small three dimensional objects from a fluid medium with the building of the three dimensional object being accomplished through the use of a continuous extrusion of a viscous, ultraviolet light, fast cured fluid medium from a dispensing nozzle in association with an ultraviolet light and object support platform with relative movement between the nozzle and the support platform being directed by an operator or preprogrammed computer.

Previously, a computer aided design system has long been known. By utilizing a computer, an operator is able to design three dimensional objects and display that design on a monitor. The monitor is used to visually represent the design that is wanted by the operator. The design can be changed within the computer aided design system altering its shape and/or increasing or decreasing its size with the changed shape displayed on the monitor. Once the desired shape and size has been obtained, as an artist's mental image or on a computer screen, the artist/operator can produce the first layer of the object by extrusion of a continuous bead of a viscous liquid in the outline of the object and, then by raising the dispensing nozzle height by the diameter of the bead and repeating the outline-producing movement, the machine forms the object layer by layer.

Within the prior art, U.S. Pat. No. 4,665,492, inventor William E. Masters, produced prototypes in a similar manner wherein individual particles of material are propelled from a nozzle to a particular location and the prototype is built in this manner.

The system of U.S. Pat. No. 4,665,492 has the potential of being accurate when using small particles but is a slow and time consuming procedure when creating a large object like a boat hull or car exterior. The alternative of using large particles would expedite the process but would create a very rough overall effect in contrast to the smooth bead created by the proposed continuous extrusion fabrication process of this invention. Large smooth contoured shapes cannot accurately and quickly be obtained with the system of U.S. Pat. No. 4,665,492.

Also, within U.S. Pat. No. 4,575,330, invented by Charles W. Hull, a three dimensional object is created by solidifying a narrow bead within a bath of resin with a laser beam one layer at a time. This system of U.S. Pat. No. 4,575,330 produces a partially cured accurate shape contained within the resin bath which is then post cured after removal from the bath.

Several disadvantages of the Hull patent are apparent. For large parts, such as automobile exteriors, the Hull patent would require a resin bath larger than the object to be made. Enough resin to fill a twenty foot long bath for an automobile exterior, is prohibitively expensive. Also, to solidify a bead large enough to be structurally stable when making a twenty foot long part requires a very powerful laser involving great expense as well as presenting a dangerous work environment. In addition, the Hull patent requires post curing. The Hull patent has a lack of structural rigidity for large objects prior to post curing. Handling of large objects for post curing would be most difficult. Large objects cannot be quickly and economically formed by using U.S. Pat. No. 4,575,330.

However, the aforementioned patents, as well as the present invention, are for the purpose of satisfying a long existing need in the design and production field for rapidly and reliably creating an object from design concept to a tangible form. Typical structures could range in size from small objects such as special shaped bottles to very large designs such as statuary, aircraft aerodynamic shapes and ship hull hydrodynamic test shapes.

Individuals who have been concerned with the development of production of three dimensional objects both small and large, have long recognized the desirability for improvement in a more rapid, reliable, economical means which would facilitate moving from a design stage of an object to a finished product. It is the intention of the present invention to answer that need especially for economically producing very large objects which has not been possible using prior art.

Another field of usage of the apparatus of the present invention is to use the apparatus to produce complex movie set pieces which are large and of imaginative irregular shapes which when shown on film appear to be most realistic. Cost as well as time required utilizing the subject continuous extrusion of the present invention to produce movie sets is substantially decreased from traditional fabrication methods.

SUMMARY OF THE INVENTION

The present invention comprises a continuous extrusion fabrication system which provides a fast and inexpensive system for generating three dimensional objects both large and small, utilizing readily available technology. The present invention utilizes the structure of a computer to allow operator control via a joystick or to generate graphics which in turn control a continuous extrusion fabrication process.

Continuous extrusion fabrication is the method and apparatus for making solid objects by successive building of the object by extruding a controlled bead in layers of a curable material.

The present invention produces a three dimensional object with continuous extrusion in a horizontal plane of an instantly ultraviolet cured bead of viscous fluid with the successive beads being placed one on top of or adjacent to the previous bead in a controlled, stacked relationship until the total shape of the three dimensional object is obtained. The nozzle from which the light curable viscous liquid material is dispensed is surrounded by ultraviolet light energy so that the light is not only constantly hitting the properly placed portion of the dispensed bead but is also providing a secondary cure of previously dispensed beads to further cure the object. A light shield located between the nozzle prevents immediate curing of the viscous fluid before it is properly placed. The high viscosity and bead stickiness of the fluid retains the proper bead relationship as the cure takes place. A light observing window, in the form of a cone, surrounds the nozzle in a spaced relationship.

Simple shapes may be made as a free-form artistic endeavor with the operator visually and manually controlling the nozzle movement with a joystick as the object takes shape. This would most likely be in a circular symmetrical shape. However, with practice, a skilled operator can make complex irregular shapes.

Objects of any size, from small shapes like perfume bottles to very large objects like boat hulls or large topography models, can be quickly and accurately produced, their maximum size restricted only by the size of the working area, the nozzle controller movement and flow of fluid medium.

The formed object may be the final product ready for its finish work or may be used as a mold master, for a boat hull, for example, on which fiberglass would be overlaid providing structural integrity. Addition of strengthening short fibers of glass, kevlar or other small translucent particles mixed with the bead material will serve to reinforce the overall part while not inhibiting the light cure. These fibers will also serve to increase bead-to-bead adhesion by protruding into the adjacent bead as well as retaining the desired configuration during the curing process.

An objective of the proposed continuous extrusion bead method of fabricating an object, especially large objects, is that there is no liquid wasted and there is no ancillary liquid required during the fabrication process. Three dimensional typography depicting a before and after earth grading project is an excellent application of the present invention.

In the making of parts, it is common to first make a prototype mold which is then used to make the particular part. The particular part is then altered in its size and/or shape for reason of improvement and once a particular configuration has been obtained, a production mold is then built. The construction of a prototype mold is a very expensive operation which can be completely eliminated when utilizing the actual object formed by the subject invention. Also the time required to produce the part within the subject invention is substantially shorter than the time required for the many progressive steps needed when making a prototype part utilizing a mold. Thus, the part is made directly from the design concept rather than being made from a mold.

DETAILED DESCRIPTION OF THE PREFERRED EMBODIMENT

Figure 1:
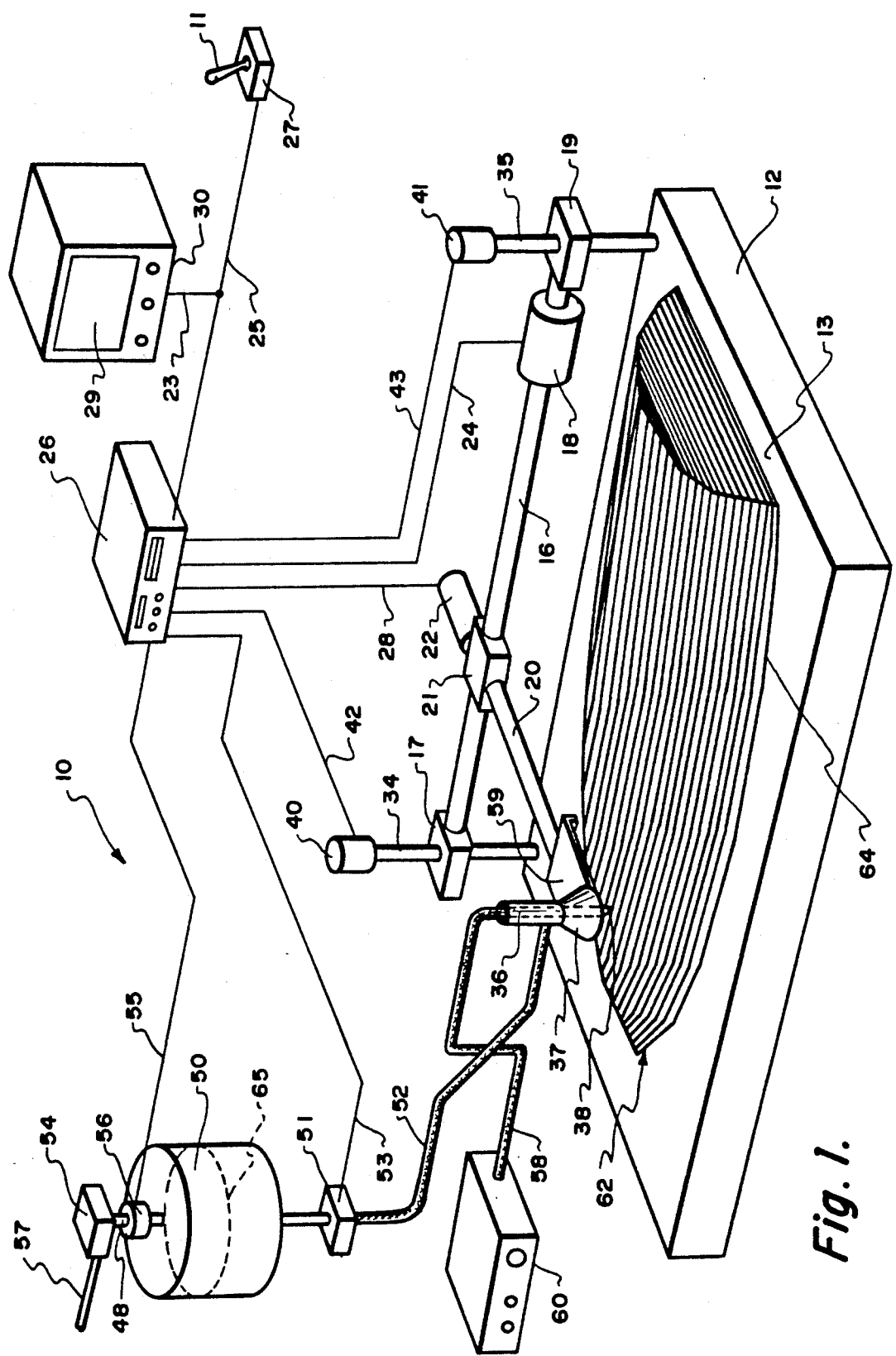
FIG. 1 is a schematic drawing of the structure of the present invention that is to be required to achieve the fabrication of objects in accordance with the intent of the present invention.

Referring particularly to the drawing, there is shown the apparatus 10 of this invention. It is to be understood that the apparatus 10 is shown schematically with the exact structure being avoided. It is to be understood that numerous types of apparatuses, either manually or computer controlled could be utilized to achieve the concept of the present invention.

Apparatus 10 includes a mounting base 12 which has a planar upper surface defined as a platform 13 upon which is located the fabricated object 62. A fluid dispensing nozzle 36 is mounted in such a manner that its position is movable in relation to the mounting base 12 and object 62 to be formed. This movement is accomplished by use of a three axis mechanism controlled by three separate servo motors whose movement is directed manually by a computer program by means of a joystick 11. The X-axis is controlled by servo motor 22 attached to lead screw 20 mounted within support block 21. The Y-axis is controlled by servo motor 18 and is attached to lead screw 16. Lead screw 16 passes through support block 21. One end of lead screw 16 is mounted for free rotational movement on support block 17 with the opposite end of lead screw 16 being freely rotationally mounted on support block 19. The Z-axis, the vertical axis, is controlled by servo motors 40 and 41 which are attached to lead screws 34 and 35, respectively. Lead screw 34 is mounted on support block 17 and causes vertical movement of such. Lead screw 35 produces the same movement of block 19. The outer end of lead screw 34 is freely rotationally mounted on mounting base 12. The outer end of lead screw 35 is freely rotationally mounted on mounting base 12. Motors 40 and 41 are always to be operated simultaneously. Also, lead screws 20 and 16 can be operated simultaneously so there will be a combined X-axis and Y-axis movement of the nozzle 36.

The servo motors 18, 22, 40 and 41 are connected respectively electrically by lines 24, 28, 42 and 43 to a computer machine 26. The computer machine 26 is conventionally available and is frequently termed a CAD or a CAM machine. CAD stands for "computer aided design" and CAM stands for "computer aided manufacturing".

Machine 26 is to be programmed or directed via manual joystick 11 to include the coordinates of the particular design that is to be created. The design will result in the production of the object 62. The present invention harnesses the principles of the computer machine 26 to generate graphics to produce a three dimensional object directly from computer instructions with operator override capability through joystick 11 mounted on joystick box 27. Joystick box 27 is electrically connected by line 25 to machine 26 and also electrically connected by line 23 to monitor 30. The object 62 can comprise an art form, a product prototype or a final product mold. Another desirable use of the present invention would be for the construction of three dimensional topographical maps.

The subject matter of the present invention, as previously stated, has to do with continuous extrusion fabrication which is a method and apparatus for making three dimensional objects by building of the object through the application of a continuous bead 64 of viscous curable material, generally an ultraviolet light curable liquid material. The beads 64 can be on top of each other at any angle or alongside each other.

Operation of machine 26 creates an image of the object 62 on screen 29 of a monitor 30 and a program is written to drive the apparatus 10 in order to create the object 62. Machine 26 electrically controls through line 55 a valve 56 in pneumatic line 48 connected to reservoir tank 50. Line 48 connects to pressure regulator 54. Pressure regulator 54 is connected to a source (not shown) of pressurized air by line 57. The tank 50 is to contain the source of the curable liquid 65 which is generally viscous. The pressure regulator 54 is computer controlled.

From the tank 50 there is an outlet tube 52 controlled by valve 51 which is controlled by machine 26 through electrical line 53. Outlet tube 52 must be flexible to permit nozzle 36 to move freely. Valve 51 controls the supplying of the viscous fluid to nozzle 36. The nozzle 36 includes a readily replaced tip 38 through which the curable liquid 65 is to be dispensed to produce the prototype 62. The machine 26 will function to move the nozzle 36 while at the same time dispensing a constant stream controlled by valve 51 of the curable viscous liquid 65 from the tip 38 of the nozzle 36.

The machine 26 will cause the nozzle 36 to be moved so that bead 64 of the object 62 is created with this bead 64 initially resting directly on the mounting base 12. When the bead 64 has circumscribed the object s basic shape, the machine 26 will cause the nozzle 36 to be moved horizontally, vertically or at an angle resulting from both horizontal and vertical movement, a distance approximately equal to the thickness of bead 64. The thickness of the bead 64 is controlled to fit the requirement of the object size. In other words, a large part would have a thicker bead 64 than a smaller part. Machine 26 will then raise the nozzle one bead thickness and cause another bead 64 to be reproduced which will abut against the first bead 64. This will be repeated with vertical and horizontal and sloping surfaces being formed until the object 62 is completed.

Figure 2:
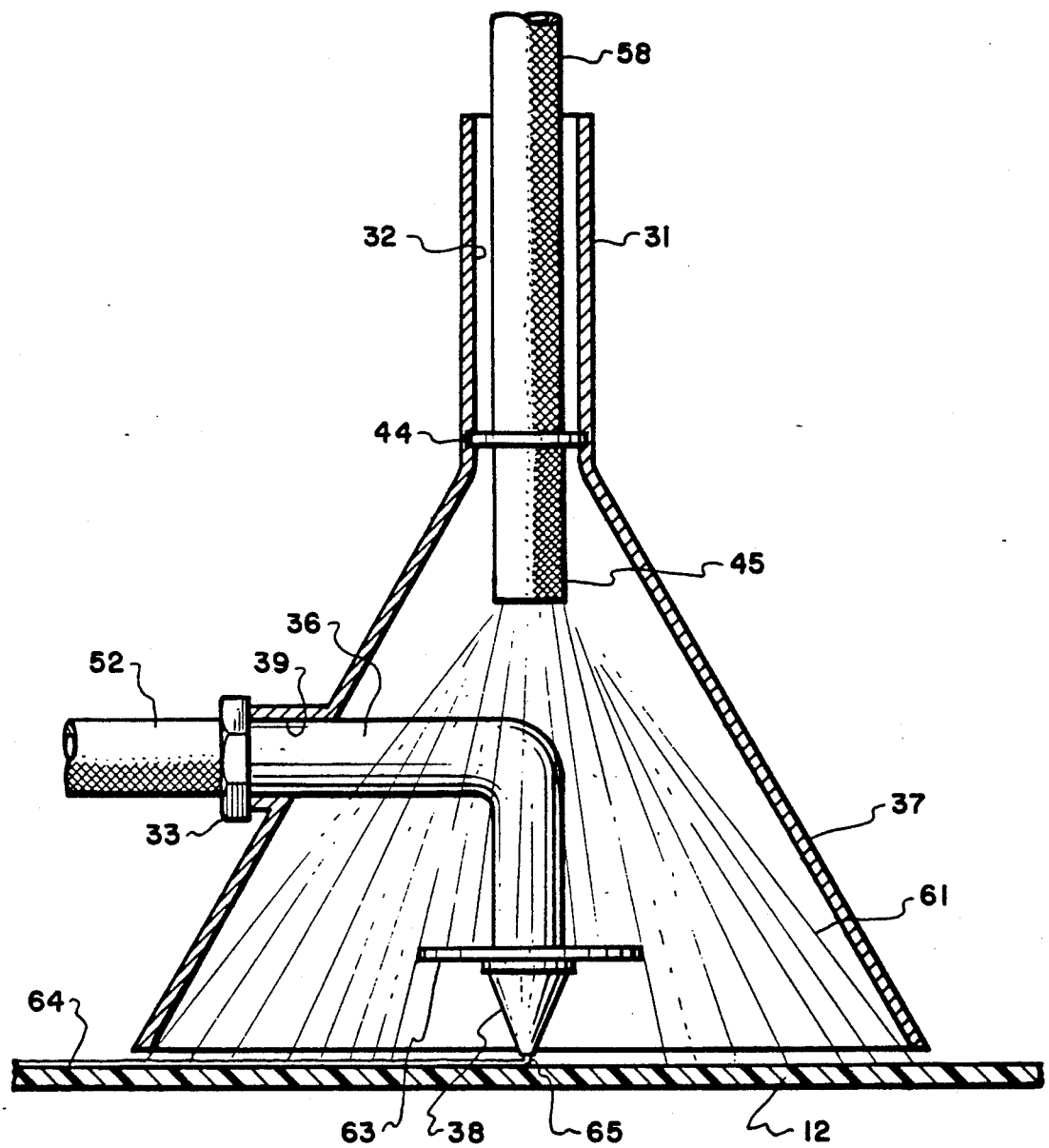
FIG. 2 is an enlarged cross-sectional view through the light observing window showing in detail the nozzle and the light shield.

The nozzle 36 is fixedly mounted on light observing window 37. Nozzle 36 is fixed within opening 39 in window 37. Nut 33 attaches nozzle 36 to outlet tube 52. Light observing window 37 is cone shaped and is intended to permit a human being to observe the light emitted from light pipe 58 without damage to one s eyes. Window 37 is to comprise a polycarbonate, UV light absorbing material such as LEXAN (tradename). Window 37 is attached to plate 59 whose movement is controlled by machine 26 in the X, Y, and Z-axes. Plate 59 is mounted on lead screw 20. Movement of window 37 results in simultaneous movement of nozzle 36. Light pipe 58 is fixed to the interior wall 32 of sleeve section 31 of window 37 by washer 44. The output lens 45 of light pipe 58 is positioned some distance within the cone configuration of window 37 as is shown in FIG. 2.

The curable liquid 65 must have several important properties. One property is that it must cure rather quickly (almost immediately to achieve a solid configuration) when exposed to ultraviolet light Another property is that it must be adhesive so that successive layers will adhere to each other. The curable liquid 65 must be low enough to viscosity to be flowable when applied and yet viscous enough to retain its shape until the ultraviolet light contacts the liquid and effects its cure. The liquid 65 must also be translucent to ultraviolet light in order to be quickly cured throughout and should be non-toxic and non-irritating to human skin.

There are available different types of liquid 65 that meet the foregoing criteria. However, one liquid 65 that is available is Compound Litetak 375, made by Locktite Corporation of Newington, Conn. A process to make a typical ultraviolet curable liquid 65 is described within U.S. Pat. No. 4,100,141, entitled STABILIZED ADHESIVE AND CURING COMPOSITIONS.

Because the liquid 65 is so fast curing, it is important to not have the light rays 61 immediately strike the liquid 65 as it exits nozzle tip 38, as clogging will occur. To prevent this, light shield 63 is mounted on nozzle 36 directly adjacent tip 38. Light shield 63 is in the shape of a washer (or doughnut). The light shield 63 permits the bead 64 to be laid down and as the nozzle 36 is moved the light rays 61 will strike the bead 64 and immediate hardening of such will occur.

Glass or plastic fibers (not shown) can be added to increase the thickness of bead 64 plus bead adhesion as well as to increase overall structural integrity when making large objects.

A typical example for the computer machine 26 is COMPUADD 25 Mhz 486 PC. of Austin, Tex., with a three axis motion control interpolator using RS 274D format from N.C. Electronics Services, Camarillo, Calif. Computer machine 26 is to be programmed not only with the coordinates of prototype 62 that is to be created but also is programmed according to the type and viscosity of curable liquid 65 that is utilized so that the machine 26 can be set to a speed for which the nozzle 36 is to be moved. The machine 26 is also to be programmed to turn off and on valve 51 which controls flow of the curable liquid 65.

MASTERCAM from CNC Software, Inc. is a typical software program that, when installed in machine 26, can be readily programmed to accomplish the tasks previously described.

Glentek of El Segundo, Calif. provides a typical D.C. motor and resolver (Motors 18, 22, 40 and 41), Model 2300-1013, for driving the three axis lead screws 16, 20, 34 and 35 to provide precise control of nozzler movement.

The source of ultraviolet light is supplied by control box 60. Box 60 provides a concentrated high power light source into light pipe 58 which in turn illuminates the liquid 65 as it extrudes from the tip 38. Light pipe 58 must also be flexible to permit free movement of nozzle 36. A three hundred sixty degree light cone is created by window 37 providing immediate cure of the liquid 65 regardless of the direction of the nozzle 36 movement. The light shield 63 shadows the nozzle tip 38 preventing premature cure of liquid 65 which will clog tip 38.

Engineered fiber optic systems of Mississauga, Ontario, Canada, manufactures an ultraviolet light and a desirable form for light pipe 58 would be model ULTRACURE 100 manufactured by the same manufacturer. A desirable curable liquid would be what is manufactured by Locktite Corp., Compound Litetak 375.

What is claimed is:

1. An apparatus for producing large and small objects comprising:

an object support platform upon which an object is to be created;

a source of curable viscous liquid including an outlet liquid tube through which said liquid is flowable and terminating in a nozzle tip through which said viscous liquid is to be extruded, said nozzle tip being located directly adjacent and above said object support platform, viscous liquid from said source is sufficiently viscous to be capable of retaining its shape while being deposited directly on said object support platform, said viscous fluid being curable into a solid when subjected to light energy, horizontal relative movement to occur between said object support platform and said nozzle tip while said nozzle tip is continuously extruding said viscous liquid while ultraviolet light continuously strikes said viscous liquid that is extruded and affects a cure thus forming the first layer and basic shape of said object to be fabricated, after completion of said first layer vertical relative movement to occur between said object support platform and said nozzle tip of a distance equal to the thickness of said first layer in a direction away from said object support platform preparing said nozzle tip to initiate making a second layer of said object and so on until said object is completed;

programmable means to produce said relative movement, said programmable means to be preprogrammed according to the size and shape of said object, said programmable means directing said relative movement along with controlling the flow of said viscous liquid;

an ultraviolet light source emitting a light beam directed toward said nozzle, said light beam to cure said viscous liquid;

a light shield mounted on said outlet tube and located directly adjacent said nozzle tip, said light shield preventing premature solidification of the extruded said viscous liquid which would cause clogging of said nozzle tip, said light shield being located between said light source and said nozzle tip, said light shield comprising a washer shaped structure shadowing said nozzle tip; and a cone-shaped light observing window attached to said outlet tube and said light source, said outlet tube and said light source being fixedly secured to said light observing window, said light observing window surrounding said light beam and said nozzle tip, said light observing window permitting observing of said light beam by a human being without causing injury to the eyes of the human being.

2. The apparatus as defined in claim 1 wherein:
said viscous liquid being translucent thereby allowing complete cure to take place as the object is created.

3. The apparatus as defined in claim 1 including:
means for emitting said light source in a three hundred sixty degree pattern about said nozzle tip.

4. The apparatus as defined in claim 3 including:
means for moving said nozzler tip simultaneously with said light source.

5. An apparatus for producing a prototype comprising:

a prototype support platform upon which a prototype is to be created;

a liquid source terminating in a nozzle through which a viscous liquid is to be dispensed, said nozzle being located directly adjacent said prototype support platform and viscous liquid from said liquid source is capable of being deposited directly on said prototype support platform, the viscous liquid being curable into a solid when subjected to light energy, horizontal relative movement to occur between said prototye support platform and said nozzle, the depositing of the viscous liquid being continuous in the form of a narrow bead during said horizontal relative movement, vertical relative movement to occur between said prototype support platform and said nozzle with said vertical relative movement comprising an incremental series of short distances in a direction away from said prototype support platform, said horizontal movement normally occurring between a directly adjacent sequence of said series of short distances of said vertical movement;

programmable means to produce said relative movement, said programmable means being preprogrammed according to the size and shape of said prototype, said programmable means directing said relative movement along with the dispensing of the viscous liquid to produce said prototype;

a source of light for producing light energy for curing said viscous liquid, light direction means located directly adjacent to said nozzle, said light direction means for beaming the light energy toward said nozzle, the light energy from said source of light being transmitted to said light direction means prior to being applied to said prototype, said light direction means emits said light energy in a three hundred sixty degree pattern about said nozzle;

a light shield, said light shield being mounted directly adjacent said nozzle, said light shield comprising a washer shaped structure shadowing said nozzle, said light shield to prevent light from contacting the immediately dispensed said viscous liquid preventing premature curing of said viscous liquid; and a cone-shaped light observing window, said nozzle and said light direction means being fixedly mounted on said light observing window, said light observing window surrounding said nozzle, said light observing window permitting observing said light energy in the area of said nozzle by a human being without causing injury to the eyes of the human being.

6. The apparatus as defined in claim 5 wherein:
said horizontal movement being constant during the production of said narrow bead.

7. The apparatus as defined in claim 6 wherein:
said short distances of said vertical relative movement being substantially equal.

8. The apparatus as defined in claim 7 including:
means for moving said nozzle to attain said vertical relative movement.

9. The apparatus as defined in claim 5 including:
means for moving said nozzle simultaneously with said light direction means.

* * * * *